US009876823B2

United States Patent
Smith et al.

(10) Patent No.: US 9,876,823 B2
(45) Date of Patent: Jan. 23, 2018

(54) SYSTEM, APPARATUS AND METHOD FOR PRIVACY PRESERVING DISTRIBUTED ATTESTATION FOR DEVICES

(71) Applicant: Intel Corporation, Santa Clara, CA (US)

(72) Inventors: Ned M. Smith, Beaverton, OR (US); Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 114 days.

(21) Appl. No.: 14/859,572

(22) Filed: Sep. 21, 2015

(65) Prior Publication Data

US 2016/0366180 A1 Dec. 15, 2016

Related U.S. Application Data

(60) Provisional application No. 62/172,911, filed on Jun. 9, 2015.

(51) Int. Cl.
*H04L 9/32* (2006.01)
*H04L 29/06* (2006.01)
(Continued)

(52) U.S. Cl.
CPC .............. *H04L 63/20* (2013.01); *H04L 9/088* (2013.01); *H04L 9/30* (2013.01); *H04L 63/0421* (2013.01); *H04L 63/062* (2013.01)

(58) Field of Classification Search
CPC ....... H04L 63/20; H04L 63/062; H04L 9/088; H04L 63/0421; H04L 67/12; H04L 9/30;
(Continued)

(56) References Cited

U.S. PATENT DOCUMENTS 7,234,059 B1 * 6/2007 Beaver ................. H04L 9/0833
380/283
8,832,461 B2 * 9/2014 Saroiu ..................... G06F 21/53
455/456.3
(Continued)

FOREIGN PATENT DOCUMENTS

EP 2482488 8/2012
EP 2840813 2/2015

OTHER PUBLICATIONS

Huang, Yueh-Min, et al. "Constructing secure group communication over wireless ad hoc networks based on a virtual subnet model." IEEE Wireless Communications 14.5 (2007).*
(Continued)

*Primary Examiner* — Michael Simitoski
(74) *Attorney, Agent, or Firm* — Trop, Pruner & Hu, P.C.

(57) ABSTRACT

In one embodiment, a method includes receiving, in a system of an external verifier of a first network, a plurality of attestation reports and a plurality of attestation values from a plurality of reporting nodes of the first network, each of the plurality of attestation values randomly generated in the corresponding reporting node based on a common random seed value; determining whether at least a threshold number of the plurality of attestation values match; responsive to at least the threshold number of the plurality of attestation values matching, decrypting the plurality of attestation reports, processing the decrypted plurality of attestation reports to obtain aggregated telemetry data of the plurality of nodes, where identity of the plurality of nodes remains anonymous to the external verifier; and enforcing a security policy based at least in part on the aggregated telemetry data. Other embodiments are described and claimed.

19 Claims, 13 Drawing Sheets

(51) Int. Cl.
  *H04L 9/08* (2006.01)
  *H04L 9/30* (2006.01)
  *H04L 12/28* (2006.01)
(58) Field of Classification Search
  CPC ............... H04L 9/3218; H04L 2209/42; H04L 12/2825; G06F 21/53; G06F 21/57
  See application file for complete search history.

(56) References Cited

U.S. PATENT DOCUMENTS

| | | | |
|---|---|---|---|
| 8,838,832 B1* | 9/2014 | Thakur | H04L 51/28 709/223 |
| 2003/0156715 A1* | 8/2003 | Reeds, III | H04L 9/065 380/37 |
| 2008/0229097 A1* | 9/2008 | Bangerter | H04L 9/3218 713/155 |
| 2009/0193027 A1 | 7/2009 | Ahn et al. | |
| 2010/0125437 A1* | 5/2010 | Vasseur | H04L 43/10 702/188 |
| 2012/0023334 A1* | 1/2012 | Brickell | H04L 9/0844 713/169 |
| 2012/0066032 A1* | 3/2012 | Snider | G06Q 30/0203 705/12 |
| 2012/0166610 A1 | 6/2012 | Doh et al. | |
| 2013/0111209 A1* | 5/2013 | Harkins | H04L 9/321 713/171 |
| 2013/0250959 A1* | 9/2013 | Van Wyk | H04L 47/365 370/393 |
| 2014/0192709 A1* | 7/2014 | Murias | H04W 28/065 370/328 |
| 2015/0134954 A1 | 5/2015 | Walley et al. | |

OTHER PUBLICATIONS

Goldschlag, David, Michael Reed, and Paul Syverson. "Onion routing." Communications of the ACM 42.2 (1999): 39-41.*
Wu, Xiaoxin, and Ninghui Li. "Achieving privacy in mesh networks." Proceedings of the fourth ACM workshop on Security of ad hoc and sensor networks. ACM, 2006.*
Wu, Taojun, Yuan Xue, and Yi Cui. "Preserving traffic privacy in wireless mesh networks." Proceedings of the 2006 International Symposium on on World of Wireless, Mobile and Multimedia Networks. IEEE Computer Society, 2006.*
Brickell, Ernie, and Jiangtao Li. "Enhanced privacy ID: A direct anonymous attestation scheme with enhanced revocation capabilities." Proceedings of the 2007 ACM workshop on Privacy in electronic society. ACM, 2007.*
Chen, Liqun, Siaw-Lynn Ng, and Guilin Wang. "Threshold anonymous announcement in VANETs." IEEE Journal on Selected Areas in Communications 29.3 (2011): 605-615.*
Krawczyk, Hugo. "SIGMA: The 'SIGn-and-MAc' approach to authenticated Diffie-Hellman and its use in the IKE protocols." Annual International Cryptology Conference. Springer, Berlin, Heidelberg, 2003.*
Walker, Jesse, and Jiangtao Li. "Key exchange with anonymous authentication using DAA-SIGMA protocol." International Conference on Trusted Systems. Springer Berlin Heidelberg, 2010.*
Yang, Yi, et al. "SDAP: A secure hop-by-hop data aggregation protocol for sensor networks." ACM Transactions on Information and System Security (TISSEC) 11.4 (2008): 18.*
International Searching Authority, "Notification of Transmittal of the International Search Report and the Written Opinion of the International Searching Authority," dated Aug. 11, 2016 in International application No. PCT/US2016/031435.
Wikipedia, "OSI Model", https://en.wikipedia.org/wiki/OSI_model#Layer_4:_Transport_Layer, Jun. 8, 2015, 7 pages.
Wikipedia, "Key Management", https://en.wikipedia.org/wiki/Key_management, May 19, 2015, 5 pages.
Wikipedia, "Publish—Subscribe Pattern", https://en.wikipedia.org/wiki/Publish%E2%80%93subscribe_pattern, Mar. 18, 2015, 4 pages.
Wikipedia, "Data Distribution Service", https://en.wikipedia.org/wiki/Data_Distribution_Service, May 21, 2015, 5 pages.
Wikipedia, "Kerberos (Protocol)", https://en.wikipedia.org/wiki/Kerberos_%28protocol%29, May 7, 2015, 6 pages.
Stackexchange, "Cryptography", http://crypto.stackexchange.com/questions/3682/how-can-the-diffie-hellman-key-exchange-be-extended-to-three-parties, Aug. 30, 2012, 1 page.
Wikipedia, "XMPP", https://en.wikipedia.org/wiki/XMPP, May 22, 2015, 7 pages.
IBM Mobilefirst, "Pairwise and Group Keys", http://etutorials.org/Networking/802.11+security.+wi-fi+protected+access+and+802.11i/Part+II+The+Design+of+Wi-Fi+Security/Chapter+10.+WPA+and+RSN+Key+Hierarchy/Pairwise+and+Group+Keys/, accessed Sep. 3, 2015, 6 pages.
Hardjono, et al., "Fluffy: Simplified Key Exchange for Constrained Environments", draft-hardjono-ace-fluffy-00, Mar. 23, 2015, 24 pages, Intel Corporation.
Openinterconnect.org, "Open Interconnect Consortium: An Overview to Connect Devices Everywhere", http://oppeninterconnect.org/wp-content/uploads/2015/07/Open-Interconnect-ConsortiumOverview_Final-.pdf, Jul. 2015, 7 pages.
Openinterconnect.org, "The Open Interconnect Consortium and IoTivity", http://openinterconnect.org/wp-content/uploads/2015/07/OIC-IoTivity_White-Paper_Final1.pdf, Jul. 2015, 5 pages.
Openinterconnect.org, "Cloud-Native Architecture and the Internet of Things", http://openinterconnect.org/wp-content/uploads/2015/07/Cloud-Native-IoT-White-Paper_white_centered_Final.pdf, Jul. 2015, 3 pages.
Openinterconnect.org, "Freedom to Implement: OIC and IoTivity", http://openinterconnect.org/wp-content/uploads/2015/07/OIC-IoT-Standards-and-Implementation_White-Paper_Final.pdf, Jul. 2015, 2 pages.
U.S. Appl. No. 14/863,043, filed Sep. 23, 2015, entitled "System, Apparatus and Method for Group Key Distribution on for a Network" by Ned M. Smith.
U.S. Appl. No. 14/864,940, filed Sep. 25, 2015, entitled "System, Apparatus and Method for Secure Network Bridging Using a Rendezvous Service and Multiple Key Distribution Servers" by Ned M. Smith, et al.
U.S. Appl. No. 14/864,957, filed Sep. 25, 2015, entitled "System, Apparatus and Method for Managing Lifecycle of Secure Publish-Subscribe System" by Ned M. Smith, et al.
U.S. Appl. No. 14/865,576, filed Sep. 25, 2015, entitled "System, Apparatus and Method for Secure Coordination of a Rendezvous Point for Distributed Devices Using Entropy Multiplexing" by Ned M. Smith, et al.
U.S. Appl. No. 14/865,191, filed Sep. 25, 2015, entitled "System, Apparatus and Method for Multi-Owner Transfer of Ownership of a Device" by Jesse Walker, et al.
U.S. Appl. No. 14/865,198, filed Sep. 25, 2015, entitled "System, Apparatus and Method for Transferring Ownership of a Device From Manufacturer to User Using an Embedded Resource" by Ned M. Smith, et al.
U.S. Appl. No. 14/856,857, filed Sep. 17, 2015, entitled "System, Apparatus and Method for Access Control List Processing in a Constrained Environment" by Ned M. Smith, et al.
U.S. Appl. No. 14/863,496, filed Sep. 24, 2015, entitled "System, Apparatus and Method for Stateful Application of Control Data in a Device" by Nathan Heldt-Sheller, et al.
U.S. Appl. No. 14/998,275, filed Dec. 26, 2015, entitled "System, Apparatus and Method for Auto-Optimization of Access Control Policy and Key Management in a Network Authoring Tool" by Ned M. Smith, et al.
U.S. Appl. No. 15/045,676, filed Feb. 17, 2016, entitled "System, Apparatus and Method for Security Interoperability Path Analysis in an Internet of Things (IOT) Network" by Ned M. Smith, et al.
U.S. Appl. No. 62/172,962, filed Jun. 9, 2015, entitled "Providing Protected Content in an IoT Network" by Ned M. Smith, et al.

(56) References Cited

OTHER PUBLICATIONS

U.S. Appl. No. 14/968,125, filed Dec. 14, 2015, entitled "A Self-Configuring Key Management System for an Internet of Things Network" by Ned M. Smith.
U.S. Appl. No. 14/757,750, filed Dec. 23, 2015, entitled "System, Apparatus and Method for Optimizing Symmetric Key Cache Using Tickets Issued by a Certificate Status Check Service Provider" Ned M. Smith, et al.
U.S. Appl. No. 14/976,165, filed Dec. 21, 2015, entitled "System, Apparatus and Method for Migrating a Device Having a Platform Group" by Ned M. Smith, et al.
U.S. Appl. No. 14/977,742, filed Dec. 22, 2015, entitled "System, Apparatus and Method for Safety State Management of Internet Things (IoT) Devices " by Ned M. Smith, et al.
Wikipedia, "Tor", https://en.wikipedia.org/wiki/Tor__%28anonymity_network%29 , Jun. 4, 2015, 14 pages.
Networkworld, "A guide to the confusing Internet of Things standards world", http://www.networkworld.com/article/2456421/internet-of-things/a-guide-to-the-confusing-internet-of-things-standards-world.html, Jul. 21, 2014, 7 Sages.

\* cited by examiner

```
400
typedef struct {
    string t-
    Name;
    Int vote;
}TelemetryItem typedef OCTET EncryptedTelemetryItem[sizeof(TelemetryItem)*
                sizeof(OCTET)* padSize];

encryptedTelemetryItem telemetryRecord[1000];
```

FIG. 5

SYSTEM, APPARATUS AND METHOD FOR PRIVACY PRESERVING DISTRIBUTED ATTESTATION FOR DEVICES

This application claims priority to U.S. Provisional Patent Application No. 62/172,911, filed on Jun. 9, 2015, in the names of Ned M. Smith and Rajesh Poornachandran, entitled SYSTEM, APPARATUS AND METHOD FOR PRIVACY PRESERVING DISTRIBUTED ATTESTATION FOR DEVICES.

BACKGROUND

Security for Internet of Things (IoT) devices is a growing concern. Attestation is a process whereby a more trusted network node may solicit vendor, configuration and operational data from a network node and make a decision whether or not to extend additional connectivity and interoperability privileges, given an understanding of potential security risks based on the information disclosed. However, privacy loss is an unfortunate side effect resulting from thorough attestations of IoT devices. As such, a challenge facing IoT devices and networks is how to minimize or mitigate security threats while protecting user's expectations for privacy amidst an ever increasingly pervasive backdrop of smart things.

BRIEF DESCRIPTION OF THE DRAWINGS

FIG. 5 is an example data structure that can be used in an embodiment or a telemetry record.

DETAILED DESCRIPTION

Figure 1:
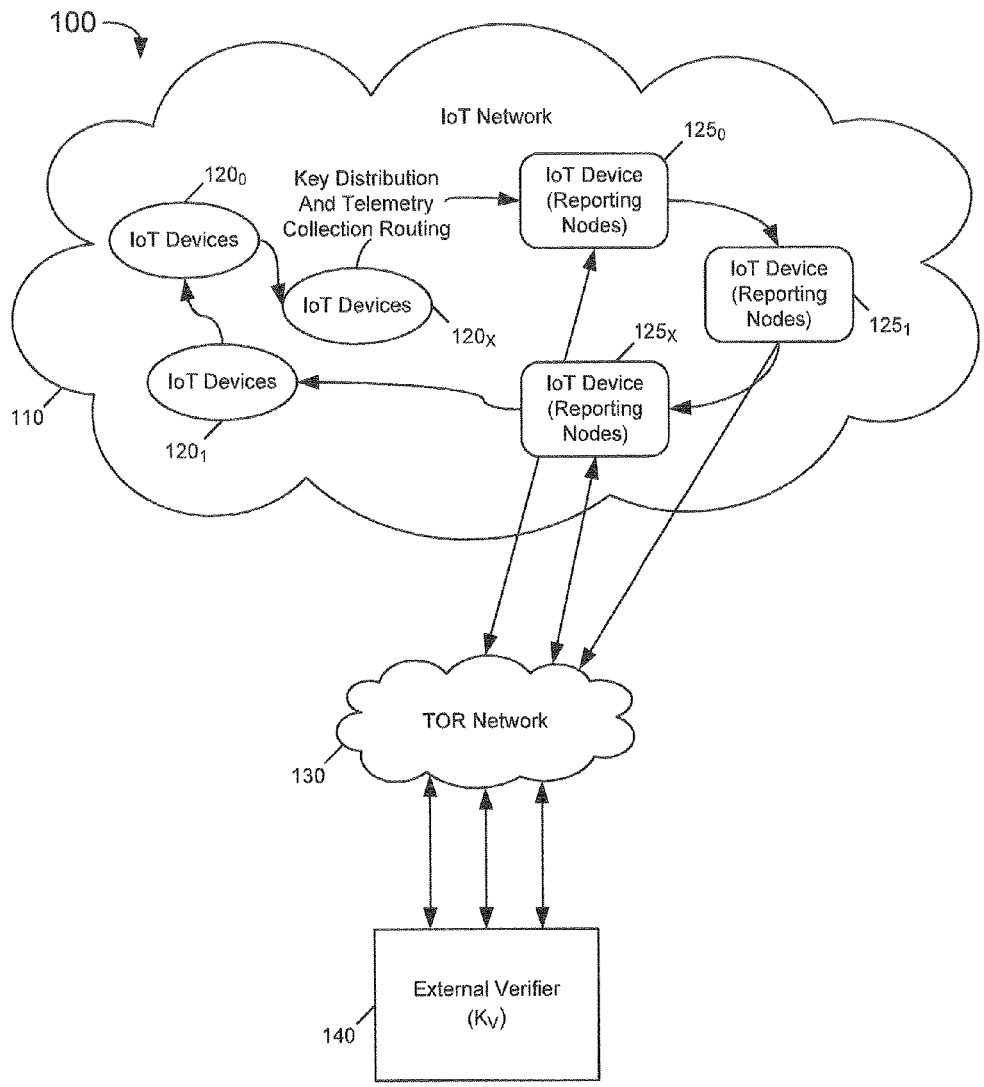
FIG. 1 is a block diagram of an overview of distributed privacy protected telemetry data communication in accordance with an embodiment.

In various embodiments, techniques are used for aggregating telemetry data obtained from IoT devices that may be ascribed to an IoT network of devices, without revealing which specific device contributed a specific telemetry datum. This approach allows any device in the network to perform an attestation to a third party device where the combined telemetry data may be reported but where the third party is not able to single out a specific device that then may be used to track privacy sensitive actions involving this device. Instead, the third party may report to a trusted IoT network manager the existence of high-risk telemetry data, allowing the network manager to address the issue.

In embodiments, additive homomorphic encryption (AHE) may be used to protect telemetry data collected into a prescribed set of categories. A MESH reporting algorithm ensures each member of the IoT network is visited, where trusted and untrusted code may be employed to tally telemetry data. Tallies arrive from neighboring nodes are previously encrypted and a local node tally is encrypted and added to the previous tally without first decrypting it. Hence, individual nodes are not at risk of compromising or exfiltrating telemetry data of a neighbor. Local nodes may rely on a trusted execution environment (TEE) within the node, such as Intel® SGX, Intel® MemCore, Intel® converged security engine (CSE), Intel® VT-X, Intel® IOT-OS with Smack, or ARM TrustZone, etc., to prevent disclosure of telemetry data in the clear.

Additive homomorphic ciphers use a public key that is distributed to a network of IoT nodes that encrypt local telemetry data, then perform an addition operation over the ciphertexts. The resultant ciphertext can be decrypted using a private key held by a third party seeking an attestation of the IoT network.

The third party depends on a trusted execution environment that performs key distribution that ensures all members of the IoT network receive a copy of the public key, that all members have an opportunity to vote and nodes designated as reporting nodes receive a copy of the final accumulated results.

In an embodiment, the attestation report is signed using an Intel® Enhanced Privacy ID (EPID) key that reveals trust properties of the TEE reporting. A TOR (The Onion Routing) network may be used to obfuscate network IP addresses of reporting nodes to avoid third party tracking of at least reporting nodes.

A third party can protect itself from rogue IoT nodes taking control of the routing and reporting functions by requiring M of N nodes report the same telemetry data. If a threshold of reports is achieved and all reports are consistent, then an attacker must compromise a majority of nodes in order to spoof the verifier, which may be a third party verifier. This is achieved by using a sign and MAC (e.g., an Intel® Sigma protocol) variant where a Diffie-Hellman (DH) public value ($g^a$) is chosen such that it is common across all reporting nodes. Since DH is vulnerable to man in the middle (MITM) attacks, a potential attacker is likely to attempt to exploit this weakness to introduce fake telemetry data. A network owner may also be motivated to perform such an attack in the interest of privacy protection when connecting to an Internet or foreign network suspected of using telemetry data to track transactions then inform third parties such as advertisers. Hence, embodiments may protect the interests of both parties.

Reporting is achieved by using the TEE in each of the reporting nodes to choose the same exponent in $g^b$ such that only legitimate reporting nodes will select the correct value while MITM nodes will select an incorrect value. The attacker must compromise a majority of reporting nodes before the verifier can be spoofed. However, use of TOR routing prevents the adversarial IoT network owner from orchestrating a cohesive MITM attack on his own nodes. Hence, the TOR network protects both the interests of the verifier and the IoT network owner. Some portion of or the entire TOR routing scheme may necessarily be implemented in the TEE to protect against device owner modifications or disablement.

Referring now to FIG. 1, shown is a block diagram of an overview of distributed privacy protected telemetry data communication in accordance with an embodiment. As seen, several IoT devices participate in an IoT network. The IoT network forms a group, where the attestation objective is to report group trust not individual trust. Some devices are designated as reporting devices, those that may interact with external entities including a group attestation verifier. Reporting nodes may use a TOR routing system to obfuscate their position (IP address) within the IoT network. The TOR network may prevent a MITM attacker from completely overtaking every node in the IoT network where it could then masquerade as a trustworthy network to the external verifier. The external verifier may be configured to use an M of N strategy to accept Sigma attestations from all reporting nodes. If a threshold of reporting nodes produces the same $g^a$ Diffie-Hellman value, then he concludes the network attestation is legitimate.

As shown in FIG. 1, a system architecture 100 includes multiple levels of a multi-network architecture. As shown, network 100 includes an IoT network 110 having a plurality of IoT devices $120_0$-$120_x$ and $125_0$-$125_x$. While these IoT devices can be of many disparate types, for generality, the IoT devices are separated into generic IoT devices 120, which may be any type of sensor, actuator or so forth, and IoT reporting devices 125, which in some cases may be somewhat more compute-intensive complex devices that have a capability for performing reporting functions as described herein. In embodiments, devices 120 and 125 may communicate according to a given routing protocol such as a mesh routing protocol. As will be described herein, each IoT device may perform telemetry collections according to a requested telemetry report format provided by an external verifier 140. Such telemetry reports after generation in a given IoT device may be communicated according to the routing protocol until the reports are provided to a given reporting node 125, which may aggregate reports and provide them to external verifier 140, via an anonymizer network 130, which in the embodiment shown may be a TOR network.

In one embodiment, IoT network 110 may be an industrial device network that provides real-time sensing and control operations, as may be present in an industrial environment such as a manufacturing or processing facility. In a given multi-network architecture, IoT network 110 may couple via a gateway to another level of the network, such as an administrative network (not shown for ease of illustration in FIG. 1). Such administrative network may be used to handle non real-time activities, exceptions, reporting, maintenance and so forth, for devices in IoT network 110. In turn, this second level of the network may communicate with another level of the network such as one or more third parties, owner facilities or so forth, e.g., via the Internet or another network arrangement.

Still with reference to FIG. 1, TOR network 130 is in communication with external verifier 140. In an embodiment, external verifier 140 may be one or more computing systems, such as one or more servers of an owner of network 100, which may be used to perform verification of the telemetry data received from IoT devices 120 and 125 within IoT network 110. As will be described herein, external verifier 140 provides a public verification key (Kv), to be used by devices in IoT network 110 for generating telemetry reports. Understand while shown at this high level in the embodiment of FIG. 1, many variations and alternatives are possible.

Figure 2:
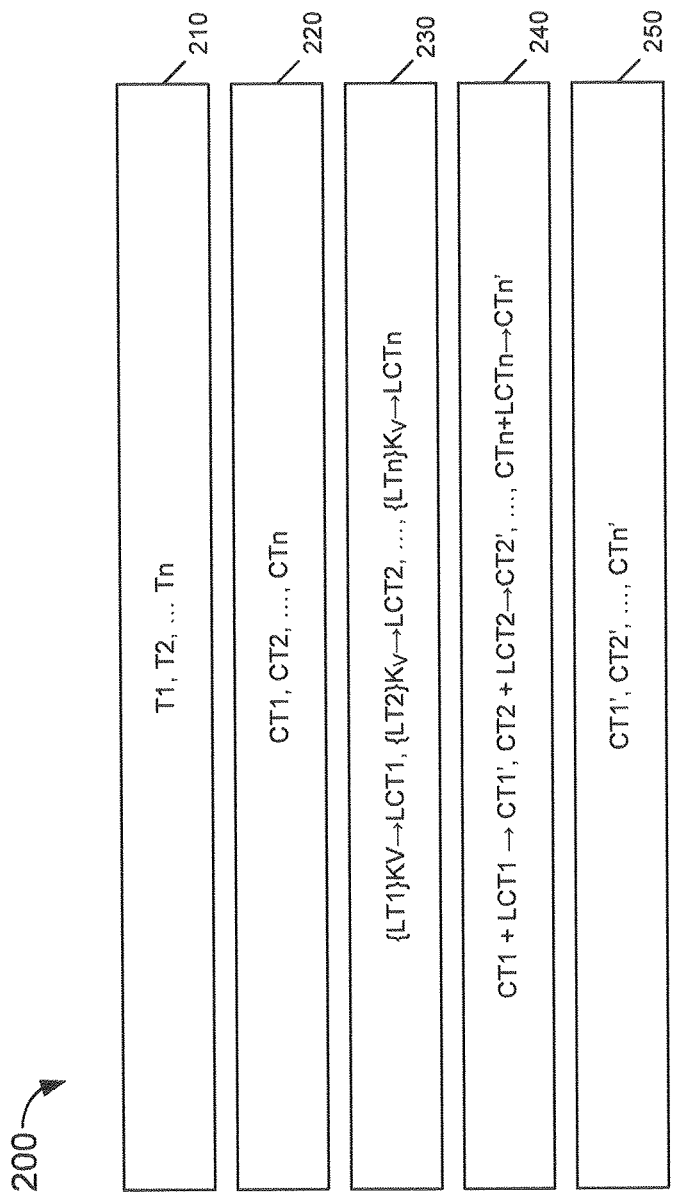
FIG. 2 is a block diagram of an additive homomorphic encryption of a telemetry record in accordance with an embodiment.

FIG. 2 is a block diagram of an additive homomorphic encryption of a telemetry record in accordance with an embodiment. An additive homomorphic encryption algorithm is used to protect the telemetry record from being inspected by intermediate nodes who may be tempted to exfiltrate the telemetry data in a privacy compromising way. Local nodes may employ a TEE environment to perform the encryption operation and to collect local telemetry voting data. While it is possible for one TEE to securely communicate cleartext telemetry records to a second TEE, homomorphic encryption ensures that telemetry data from a third TEE need not trust the second TEE even though it may trust the first TEE. Hence, there is no expectation that all TEEs in the network must form a distributed TCB having equivalent trust as a condition of telemetry data processing across the network. Note that intermediate nodes may not observe intermediate results of telemetry data collections in part due to the use of a TEE for tallying aggregate results, and further because intermediate results are encrypted. In some cases, tallying within a TEE may be sufficient for a given security policy, and the intermediate results may not be encrypted. The current node's telemetry record may be included in an intermediate telemetry report without first decrypting the intermediate results.

Referring now to FIG. 2, shown are details of a telemetry record architecture 200 in accordance with an embodiment. As shown in FIG. 2 a telemetry data enumeration class 210 provides a record format for communication of telemetry data. In an embodiment, this telemetry record may take the form of a ballot to be issued by each of the IoT devices within an IoT network. In some cases, a generic ballot format can be used by each of the devices to generate a telemetry record or ballot according to a given schedule. For example, an external verifier may request that votes be received from each device on a periodic basis, e.g., hourly, daily or so forth. As one simple example, a telemetry record (Tx) may provide information (e.g., a Boolean value) regarding activity on a particular port. For example, if a given port of the IoT device has activity within a given period (e.g., an hour) a YES vote may be communicated, otherwise a NO vote is communicated. Of course, many different fields may be present in a single telemetry record, each associated with a particular telemetry datum, such as activity on a specified port, at least a threshold of activity, sensor value of at least a threshold amount or so forth.

According to a mesh routing algorithm, a given IoT device may receive multiple input telemetry ciphertexts (CTx) 220. Each of these ciphertexts may be received from a given IoT device and can be an encrypted telemetry record of a single device or an additive homomorphic encryption of multiple devices. In addition, a given device may generate a local telemetry ciphertext (LCTx) 230 using a key value (Kv) such that local a telemetry record ($LT_x$) is encrypted into a local telemetry cipher text $LCT_x$. Then the given node performs an addition operation in which its locally generated ciphertext is combined with the inputted ciphertext 220 such that resulting additive ciphertexts $CT'_x$ 240 is generated and outputted as outputted telemetry ciphertexts 250.

Figure 3:
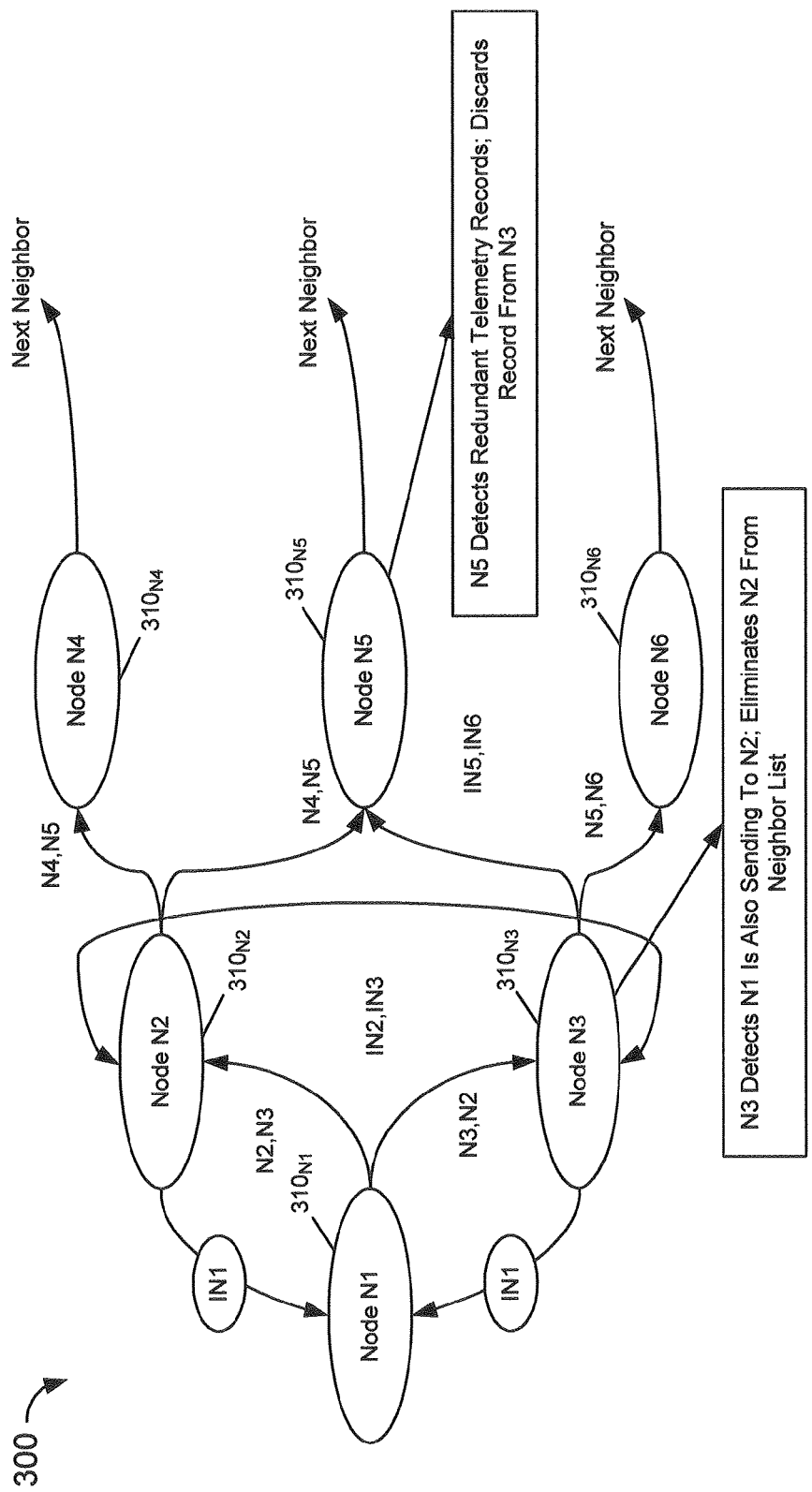
FIG. 3 is an illustration of a routing method within an IoT network in accordance with an embodiment.

Referring now to FIG. 3, shown is an illustration of a routing method within an IoT network in accordance with an embodiment. As shown, a routing method may be used to ensure that each node in the IoT network is visited but does not depend on the external verifier orchestrating routing functions or identifying discretely the nodes in the network.

The external verifier trusts the TEE of the internal nodes to have performed the routing function properly. The external verifier may obtain an attestation of the TEE of each reporting node as a method for trusting the routing logic.

As shown in FIG. 3, network 300 may be a network of IoT devices, a portion of which are shown as devices ($310_{N1}$-$310_{N6}$) present in a neighboring area of the network. As seen, neighboring nodes may communicate with each other, e.g., according to neighbor lists present in each of the devices, such as one or more routing tables.

Routing may take the form of a MESH routing method where each visited node forwards a telemetry record to a neighboring node. The neighboring nodes are informed of the other neighbors visited, allowing node $310_{N3}$, for example, to detect that node $310_{N1}$ also shares node $310_{N2}$ as a neighbor and therefore, node $310_{N3}$ need not forward to node $310_{N2}$. Additionally, if multiple neighbors route to the same node, e.g., node $310_{N5}$, the neighbor list may be used to detect receipt a redundant telemetry record.

Routing history may be used to detect when all nodes have been visited. Once all nodes have been visited, the telemetry record may be reported to an external verifier by a reporting node. Reporting nodes have the ability to perform an attestation protocol such as an Intel® Sigma (sign and MAC) protocol.

Figure 4:
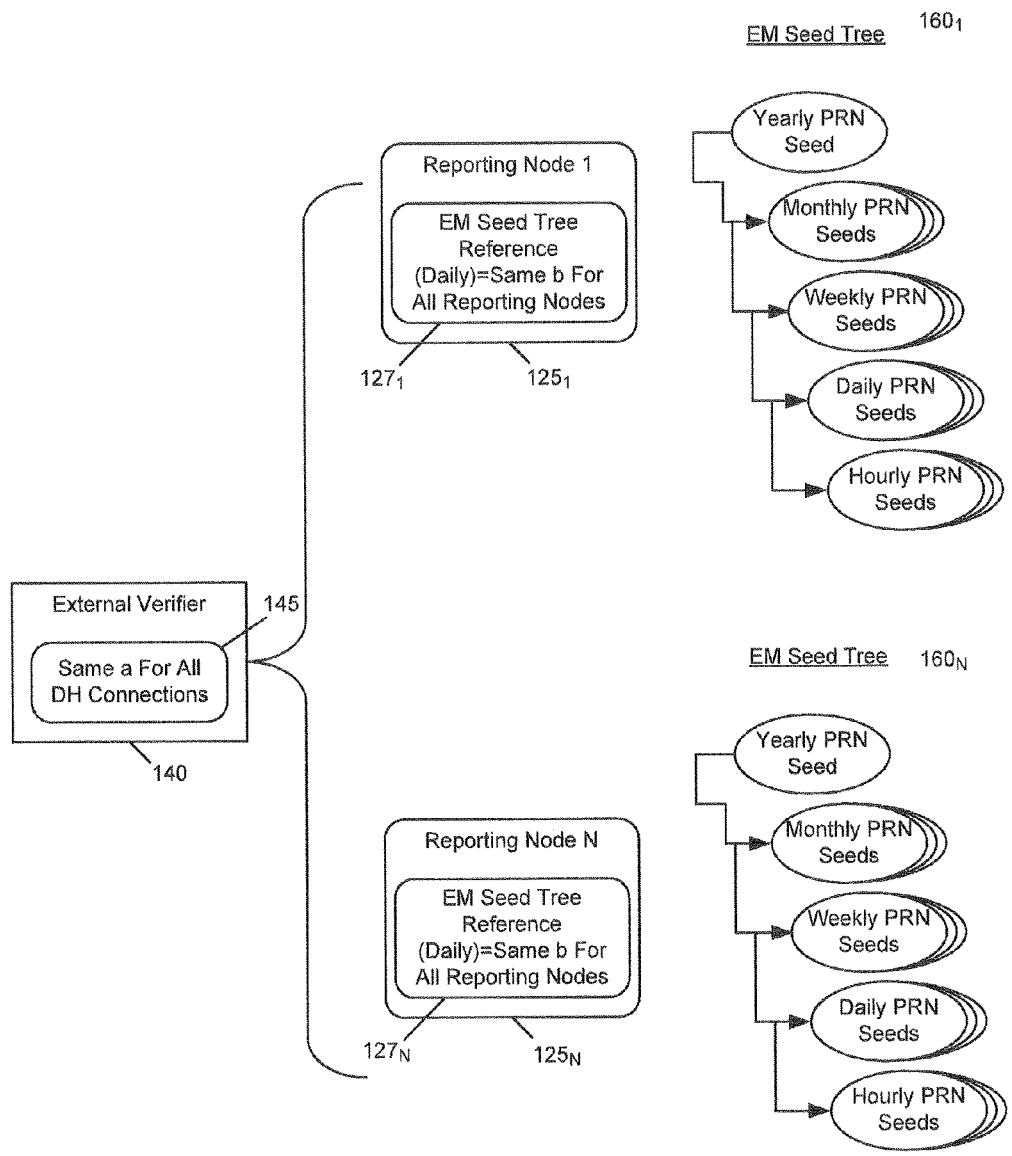
FIG. 4 is a block diagram of a plurality of reporting nodes participating in an M of N threshold scheme using entropy multiplexing in accordance with an embodiment.

Referring now to FIG. 4, shown is a block diagram of a plurality of reporting nodes $125_1$-$125_n$ participating in an M of N threshold scheme using entropy multiplexing in accordance with an embodiment. Each node 125 includes a digital random number generator 127 that may be used to generate a seed tree based on a given seed value. External verifier 140 is concerned that a MITM attacker might compromise the reporting nodes and provide a rogue telemetry record. Embodiments may counter this threat by enabling all reporting nodes to attest using the same DH $g^a$ value. Entropy multiplexing (EM) provides a method for multiple nodes to agree on a random value, while still allowing selection of new (temporal) random number frequently. Note that a seed value, which may be generated using random number generator 127 such as an Intel® Digital Random Number Generator, may be used in turn to generate, e.g., using pseudo random number generation (PRNG), a hierarchy of pseudo-random number generator seeds that multiple reporting nodes may use to produce the same DH random value when attesting to the external verifier (for a given telemetry record).

More specifically, each reporting node may generate an EM seed tree $160_1$ $160_n$. As seen, each seed tree 160 provides a hierarchy in which PRN seeds are generated according to a defined schedule (e.g., from a yearly PRN seed, monthly PRN seeds are generated, that in turn are used to generate weekly PRN seeds, in turn used to generate PRN seeds, that in turn may be used to generate hourly PRN seeds). Of course understand that more levels of a hierarchy may be present. In embodiments, each reporting node 125 may, according to a given schedule (e.g., daily), use the same b value used to generate a DH $g^b$ value.

The external verifier performs an attestation with each reporting node verifying that each supplies the same $g^a$ value. When a threshold of M values is reached, the verifier concludes that the telemetry record has not been compromised because the probability that M of N successful MITM attacks is very low.

The TOR network of FIG. 1 illustrates a method for ensuring that MITM attackers cannot use a robot to systematically schedule MITM attacks on each reporting node. The TOR network randomizes the route by which the attestation protocol travels; hence a MITM attacker must exactly predict the path for every packet exchanged in order to be successful. Use of a TOR network provides an additional layer of privacy protection for reporting nodes as well.

Referring now to FIG. 5, shown is an example data structure that can be used in an embodiment for telemetry record. Note that in data structure 400 a telemetry datum can be defined in terms of a Boolean value. For example, a given telemetry datum may be defined as activity occurring within a given time frame on a predetermined port (e.g., port 25). Depending on whether any such activity is present in the given device within the relevant time frame, this Boolean value returns either a TRUE or FALSE value. Note that much flexibility is provided by a data structure for a telemetry record herein. And as described, an external verifier may define this telemetry record per its unique security goals and requirements.

Figure 6:
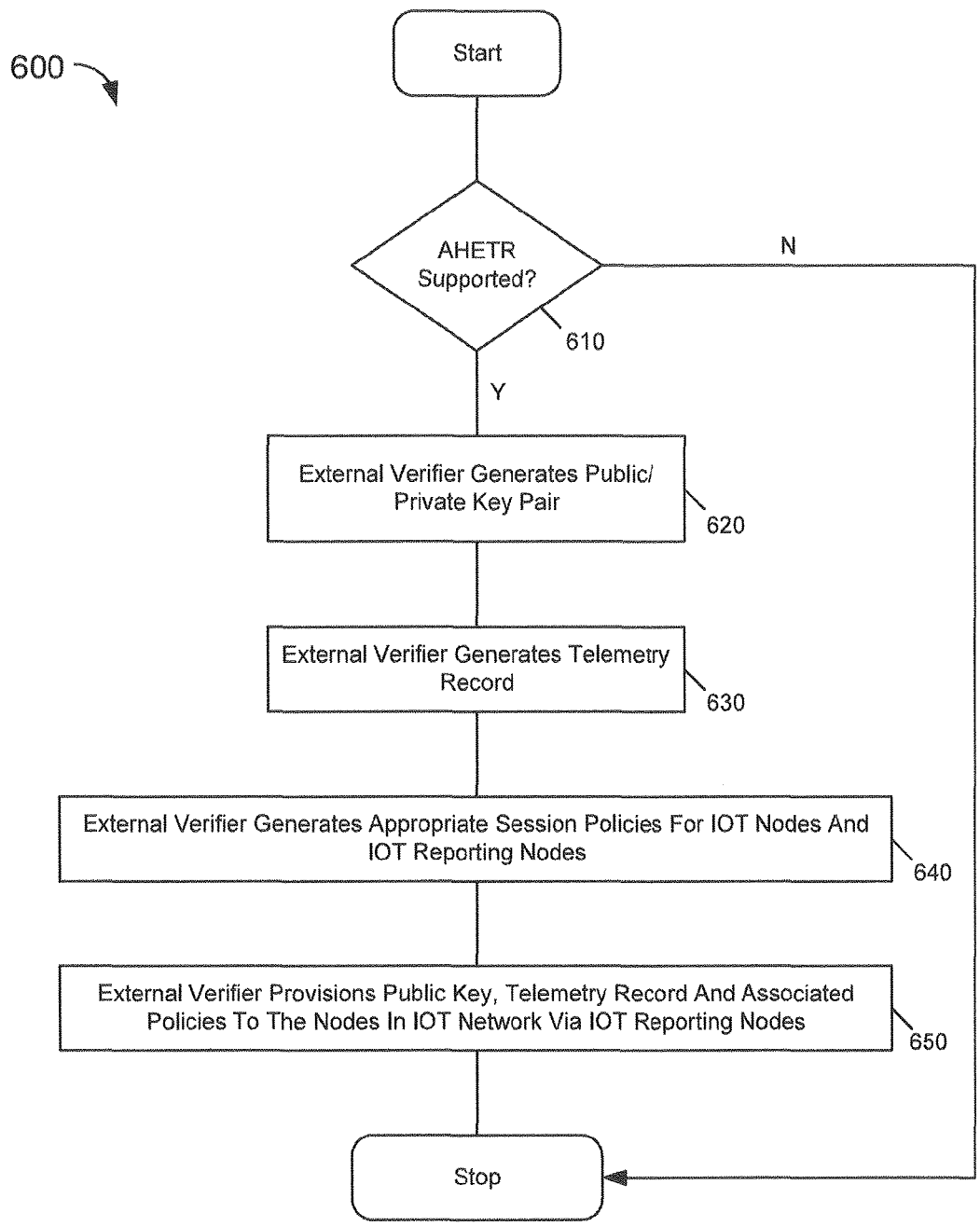
FIG. 6 is a flow diagram of a method for additive homomorphic encryption telemetry reporting (AHETR) provisioning in accordance with an embodiment.

FIG. 6 is a flow diagram of a method for additive homomorphic encryption telemetry reporting (AHETR) provisioning in accordance with an embodiment. Specifically, method 600 may be performed in a system of the external verifier using various combinations of hardware circuitry, firmware and/or software. As illustrated, method 600 begins by determining whether AHETR is supported by the system (diamond 610). If so, control passes to block 620 where the external verifier can generate a public/private key pair. In an embodiment, the key pair may be a DH key pair in which the public key is provided to the IoT network to be verified. In various embodiments, this public key can be provided to only a single node directly from the external verifier and the single node in turn may enable the same public key to be distributed to all nodes of the network, e.g., according to a mesh routing protocol. Thereafter at block 630 the external verifier generates a telemetry record. In various embodiments, this telemetry record may be a static record to define the information to be obtained as telemetry data in the desired format (which may be updated as different telemetry data is desired to be received). Next at block 640 the external verifier generates appropriate session policies for IoT nodes and reporting nodes. Such policies can take different forms in various embodiments and may include information regarding session security requirements, encryption protocols or so forth. Finally, at block 650 the external verifier provisions this information, namely the public key, telemetry record and associated policies to the various nodes in the IoT network. In an embodiment, the provisioning ensures that the same information is provided to all other nodes within the IoT network.

Figure 7:
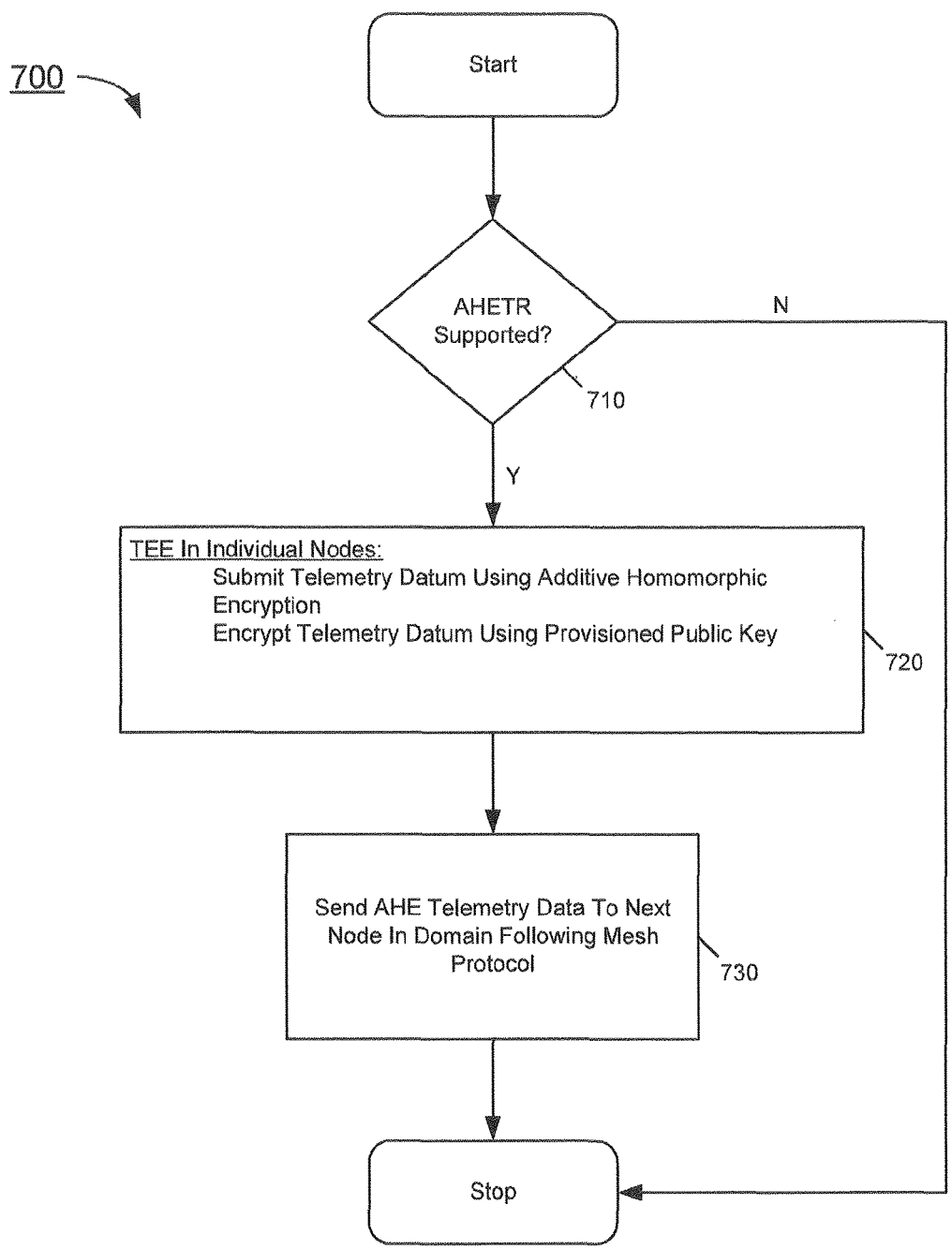
FIGS. 7-9 are flow diagrams of methods for telemetry reporting across individual node, reporting node, and external verifier in accordance with an embodiment.
Figure 8:
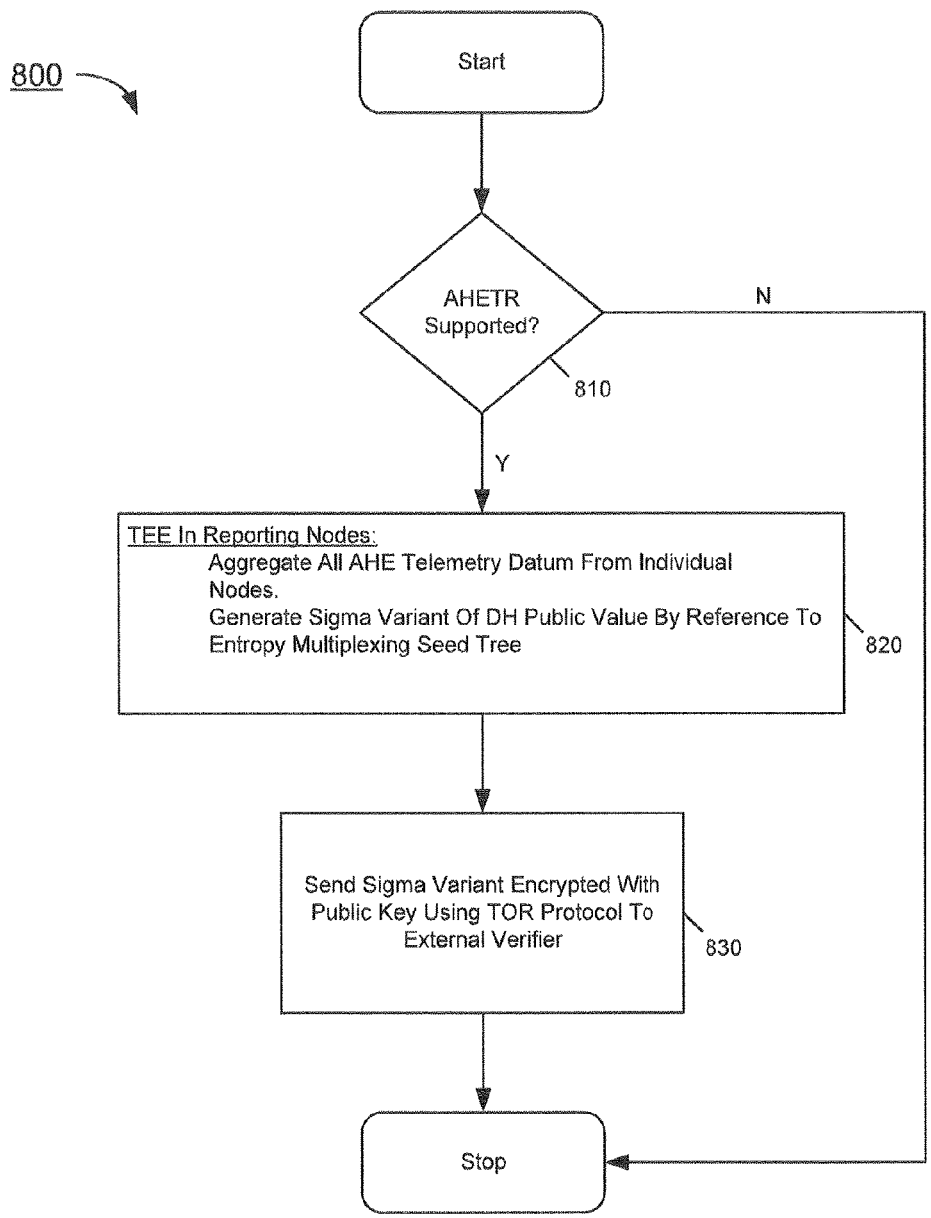
Figure 9:
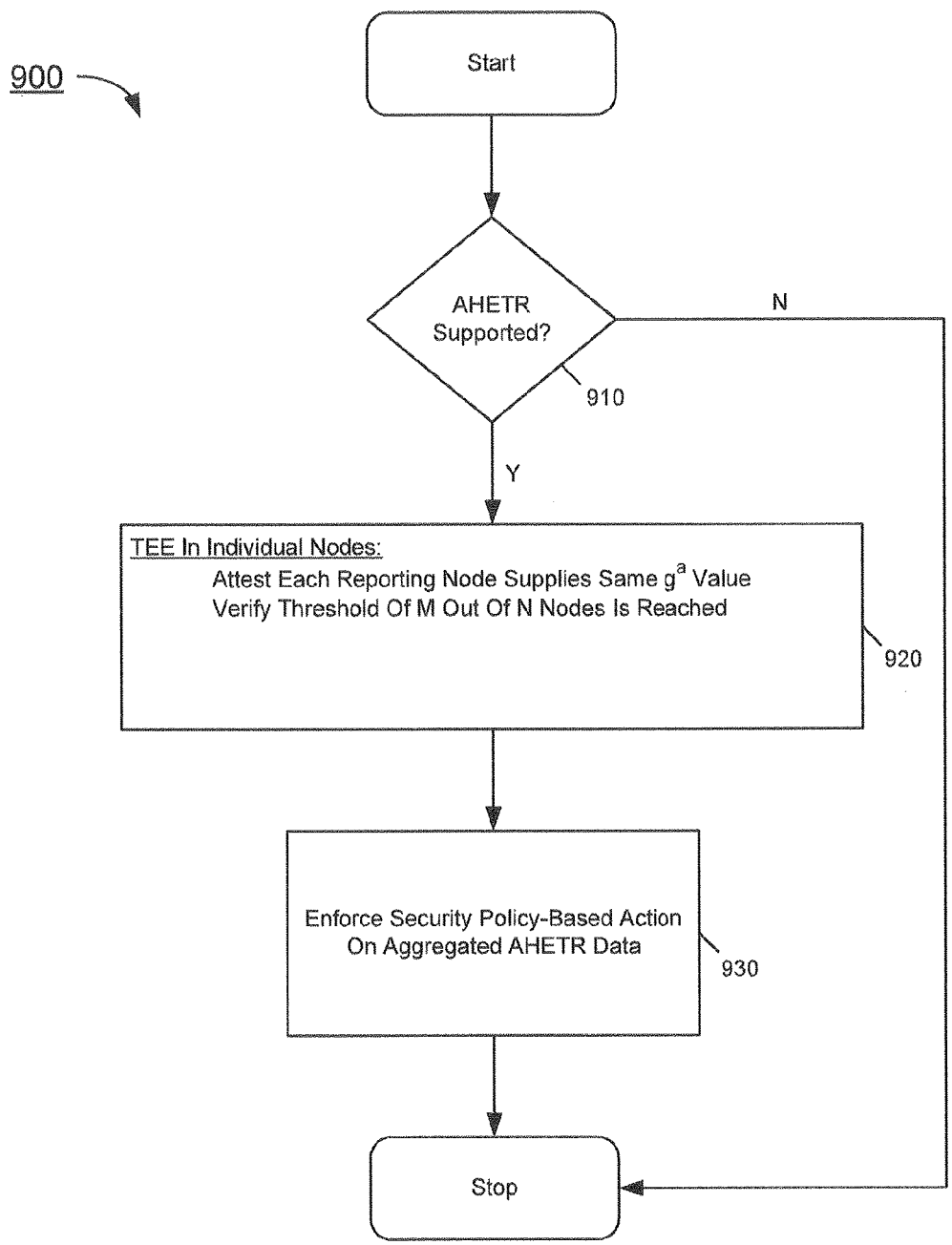

FIGS. 7-9 are flow diagrams of method for telemetry reporting across individual node, reporting node, and external verifier in accordance with an embodiment. First with regard to FIG. 7, shown is a flow diagram of an operational flow of telemetry reporting for an individual node in accordance with an embodiment. Specifically, method 700 may be performed in an individual node using various combinations of hardware circuitry, firmware and/or software. As shown in FIG. 7, method 700 may begin by determining whether AHETR is supported within the node (diamond 710). If so, control passes to block 720, which may be performed within a TEE of the node of the network. In the TEE, one or more telemetry datum, as identified according to the telemetry record received from the external verifier, is obtained and is submitted into a telemetry data report using additive homomorphic encryption. Prior to submitting the telemetry datum, it may be encrypted using the provisioned public key. Thereafter at block 730 the AHE telemetry data is sent to the next node, e.g., a neighbor node within the network, according to a mesh routing protocol. Note that eventually the reporting information from this and other nodes will reach a corresponding reporting node, where a final encrypted telemetry report can be provided to the external verifier (to provide the telemetry reporting for at least some of the IoT devices of the IoT network).

Referring now to FIG. 8, shown is a flow diagram of an operational flow for a reporting node in accordance with an embodiment of the present invention. Specifically, method 800 may be performed in a reporting node using various combinations of hardware circuitry, firmware and/or software. As shown in FIG. 8, method 800 may begin by determining whether AHETR is supported (diamond 810). If so, control passes to block 820, which may be performed within a TEE of a reporting node. More specifically here, AHE telemetry data from individual nodes may be aggregated. Then a Sigma variant of the DH public value may be generated. In an embodiment, reference can be made to the internal EM seed tree to generate this variant. Thereafter the Sigma variant is sent encrypted with the public key to the external verifier (block 830). In various embodiments, to further enhance security and ensure the anonymity of reporting and other nodes, this information may be sent through an anonymizer network such as a TOR network.

Referring now to FIG. 9, shown is a flow diagram of a verification method of an external verifier in accordance with an embodiment. Specifically, method 900 may be performed in a system of the external verifier using various combinations of hardware circuitry, firmware and/or software. As shown in FIG. 9, method 900 begins by determining whether AHETR is supported (diamond 910). If so, control passes to block 920, where various operations may be performed within a TEE of the external verifier. First the external verifier may attest that each reporting node supplies the same DHG $g^a$ value. This determination may be performed for each of the reporting nodes such that it can be determined whether at least a threshold number of nodes all report the same $g^a$ value. If so, it can be determined with high confidence that no attack has occurred and that the reporting nodes properly reported the telemetry data. As such, the encrypted telemetry data can be decrypted and processed within the external verifier. Thereafter, a given security policy can be enforced, such as by performing a security policy-based action based at least in part on the aggregated AHETR data (block 930).

For example, if it is determined that the telemetry data indicates that anomalous network activity is detected, such as excessive activity within particular ports or within a particular time period or so forth, a network remediation measure may be performed. Although the scope of the present invention is not limited in this regard, such network remediation measures may include isolation from the IoT network, increased auditing of network activity (such as on a greater granularity), and/or enforcement at the network level such as controlling the amount of transactions, isolating devices or so forth. Understand while shown at the high level in the embodiments of FIGS. 7-9, many variations and alternatives are possible.

Figure 10:
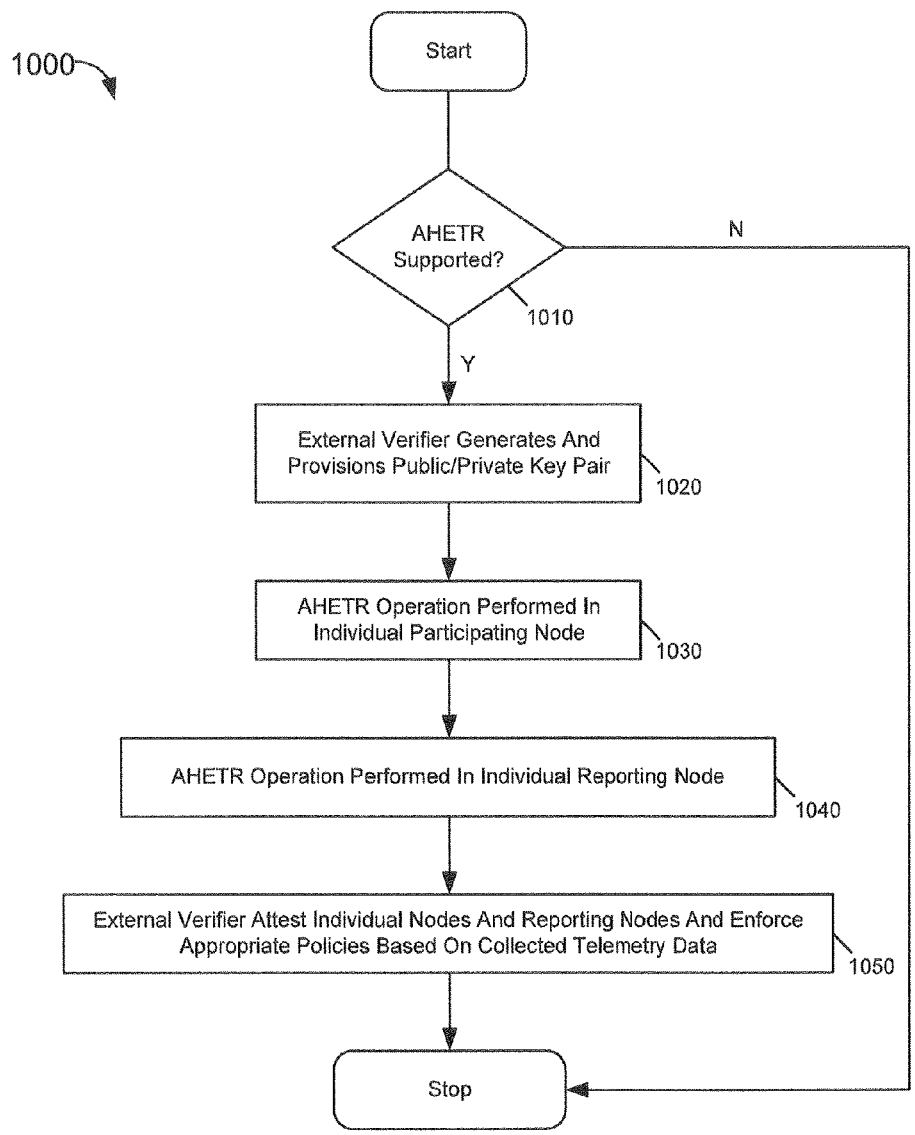
FIG. 10 is an overall flow diagram of an AHETR method in accordance with an embodiment.

Referring now to FIG. 10, shown is a flow diagram of a method for overall operation in accordance with an embodiment. As shown in FIG. 10, method 1000 may be implemented by a collection of devices, including individual IoT devices and reporting IoT devices, as well as various network entities and an external verifier. At 1010 it is determined whether AHETR is supported. If so, at block 1020 the external verifier generates and provisions a public/private key pair (discussed above with regard to FIG. 6). Then at block 1030 AHETR operation may be performed in individual participating nodes (discussed above in FIG. 7). Thereafter at block 1040, AHETR operation may be performed in individual reporting nodes (as discussed above in FIG. 8). Finally, at block 1050 the external verifier may attest individual nodes and reporting nodes and enforce appropriate policies based on collected telemetry data (block 1050), as discussed above in FIG. 9. Note that in performing this attestation, information regarding the identity of individual nodes remains hidden from the external verifier, according to the use of an anonymizer network coupled between the IoT network and the external verifier.

In various embodiments, additive homomorphic encryption may be used to tally/collect telemetry data, e.g., aggregate telemetry data that could otherwise be exploited by analytics engines to learn new knowledge beyond what is directly ascertained from a discrete telemetry datum value by an external verifier. In addition, entropy multiplexing may be used to seed a RNG tree used by a plurality of Diffie-Hellman-based attestation nodes in an IoT network to perform attestation of an IoT network where individual nodes remain anonymous to protect privacy.

Embodiments may perform this telemetry reporting in a TEE environment to protect key distribution algorithm, AHE keys, encryption using AHE keys and addition operations. In addition, the attestation reporting nodes may use an EPID to verify to an external verifier with an attestation protocol such as Sigma to ensure final reports are from a TEE trusted by both external verifier and IoT network owner to perform as expected.

In embodiments, multiple reporting nodes each use a Sigma attestation algorithm where uncompromised reporting nodes agree on a common exponent ($g^b$) value that a MITM attacker does not know and hence cannot masquerade as a legitimate node using a MITM attack node. In addition, a TOR routing network with M of N threshold scheme may be used to obfuscate the edge network identities of reporting nodes and to prevent an IoT network owner from staging a MITM attack designed to spoof the external verifier (in the interest of increased privacy) at the expense of security.

An AHE-created telemetry record collected by a TEE that also may perform intra-IoT network routing of the telemetry record where a reporting node uses an attestation algorithm such as Intel Sigma with EPID to report an aggregate telemetry record may increase security. As such, network telemetry collection and analysis may be performed to establish the trust and reputation of whole IoT networks of devices, without compromising the privacy of discrete nodes within the network.

Figure 11:
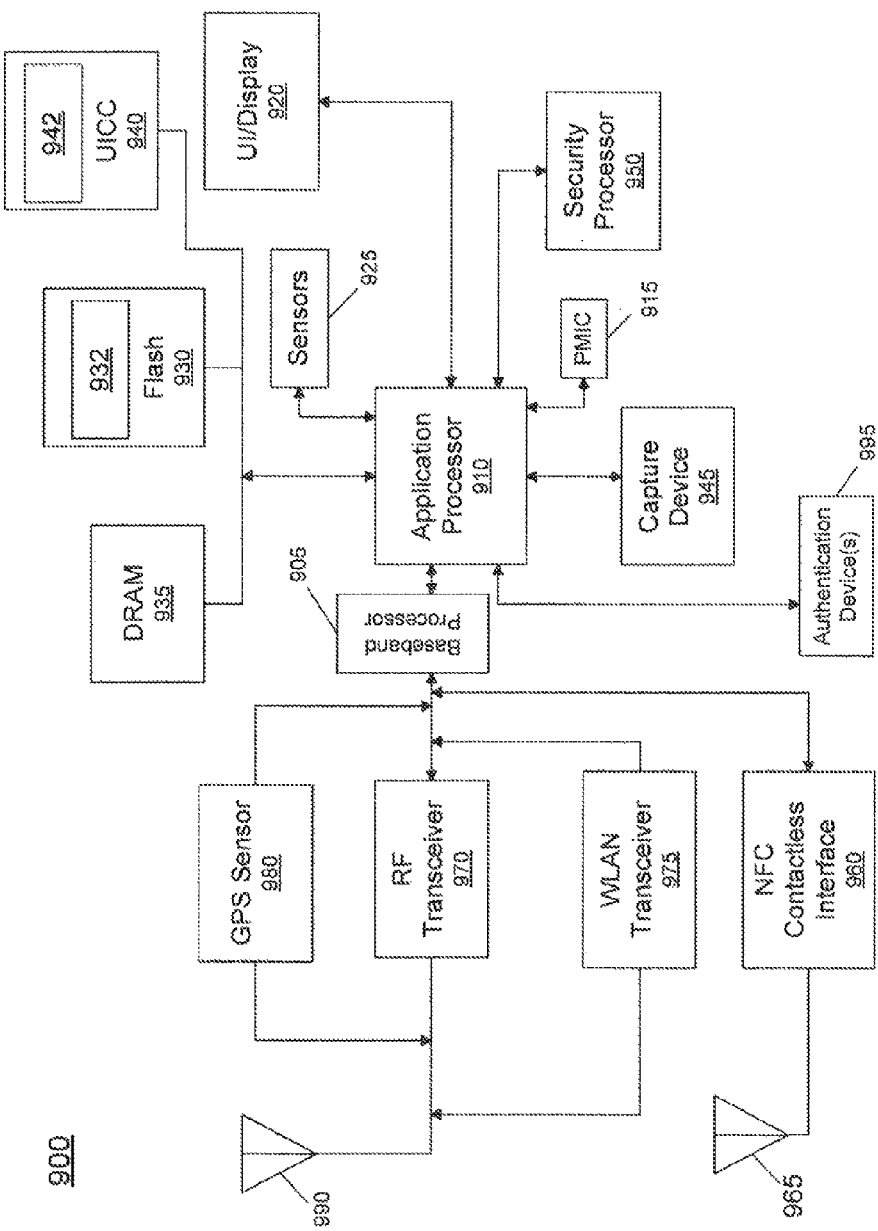
FIG. 11 is a block diagram of an example system with which embodiments can be used.

Referring now to FIG. 11, shown is a block diagram of an example system with which embodiments can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 11, a universal integrated circuit card (UICC) 940 comprises a subscriber identity module, which in some embodiments includes a secure storage 942 to store secure user information. System 900 may further include a security processor 950 that may implement a TEE as described earlier, and which may couple to application processor 910. Furthermore, application processor 910 may implement a secure mode of operation, such as Intel® SGX for hosting of a TEE, as described earlier. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 11, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 12:
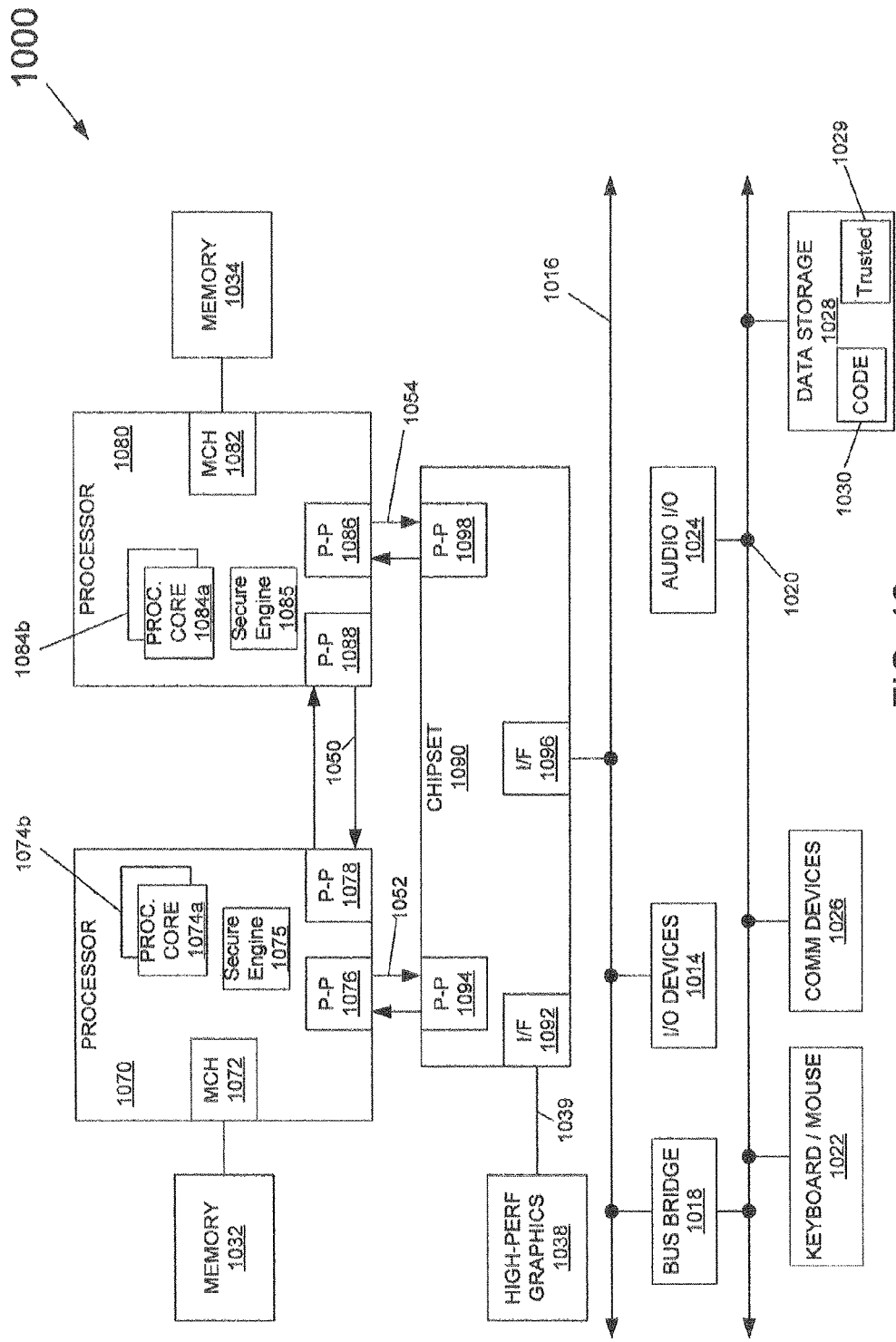
FIG. 12 is a block diagram of a system in accordance with another embodiment of the present invention.

Referring now to FIG. 12, shown is a block diagram of a system in accordance with another embodiment of the present invention. As shown in FIG. 12, multiprocessor system 1000 is a point-to-point interconnect system such as a server system, and includes a first processor 1070 and a second processor 1080 coupled via a point-to-point interconnect 1050. As shown in FIG. 12, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations, IoT network onboarding or so forth.

Still referring to FIG. 12, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 12, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 12, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 12, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Figure 13:
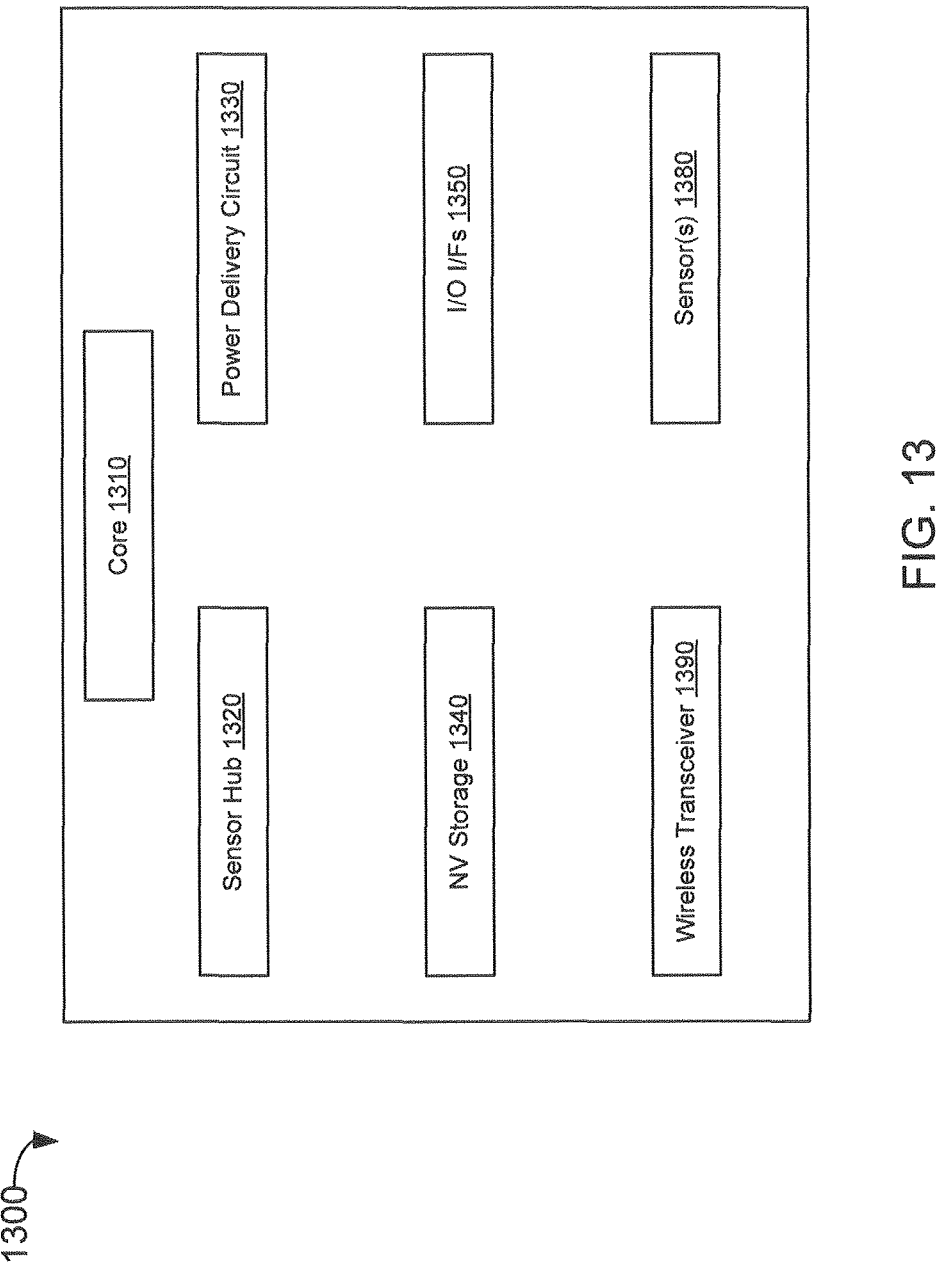
FIG. 13 is a block diagram of a wearable module in accordance with another embodiment.

Embodiments may be used in environments where IoT devices may include wearable devices or other small form factor IoT devices. Referring now to FIG. 13, shown is a block diagram of a wearable module 1300 in accordance with another embodiment. In one particular implementation, module 1300 may be an Intel® Curie™ module that includes multiple components adapted within a single small module that can be implemented as all or part of a wearable device. As seen, module 1300 includes a core 1310 (of course in other embodiments more than one core may be present). Such core may be a relatively low complexity in-order core, such as based on an Intel Architecture® Quark™ design. In some embodiments, core 1310 may implement a TEE as described herein. Core 1310 couples to various components including a sensor hub 1320, which may be configured to interact with a plurality of sensors 1380, such as one or more biometric, motion environmental or other sensors. A power delivery circuit 1330 is present, along with a non-volatile storage 1340. In an embodiment, this circuit may include a rechargeable battery and a recharging circuit, which may in one embodiment receive charging power wirelessly. One or more input/output (IO) interfaces 1350, such as one or more interfaces compatible with one or more of USB/SPI/I²C/GPIO protocols, may be present. In addition, a wireless transceiver 1390, which may be a Bluetooth™ low energy or other short-range wireless transceiver is present to enable wireless communications as described herein. Understand that in different implementations a wearable module can take many other forms.

The following Examples pertain to further embodiments.

In Example 1, a method includes: receiving, in the system of an external verifier of a first network including a plurality of nodes, a plurality of attestation reports and a plurality of attestation values from a plurality of reporting nodes of the first network, each of the plurality of attestation values randomly generated in the corresponding reporting node based on a common random seed value; determining whether at least a threshold number of the plurality of attestation values match; responsive to at least the threshold number of the plurality of attestation values matching, decrypting the plurality of attestation reports, processing the decrypted plurality of attestation reports to obtain aggregated telemetry data of the plurality of nodes, where identity of the plurality of nodes remains anonymous to the external verifier; and enforcing a security policy based at least in part on the aggregated telemetry data.

In Example 2, the method further comprises receiving the plurality of attestation reports via an anonymizer network coupled to the first network, the anonymizer network to enable the identity of the plurality of nodes to remain anonymous to the external verifier.

In Example 3, the method further comprises providing a public key to the first network, to enable the public key to be distributed to the plurality of nodes.

In Example 4, the method further comprises generating a telemetry record and providing the telemetry record to the first network, to enable the telemetry record to be distributed to the plurality of nodes, to enable each of the plurality of nodes to generate a telemetry report to be provided within one of the plurality of attestation reports.

In Example 5, the plurality of nodes comprises IoT devices, where the first network comprises an IoT network, and the system of the external verifier is coupled to the first network via an anonymizer network.

In Example 6, processing the decrypted plurality of attestation reports comprises determining a number of the plurality of nodes providing a first value for a first telemetry datum.

In Example 7, the system is to enter a trusted execution environment to receive the plurality of attestation reports and determine whether at least the threshold number of the plurality of attestation values comprises a common $g^a$ value.

In Example 9, a method comprises: receiving, in a system of a network, an encrypted telemetry data collection of one or more other systems of the network; in a TEE of the system, encrypting local telemetry data of the system; in the TEE, performing an addition operation using the encrypted local telemetry data and the encrypted telemetry data collection to generate an encrypted telemetry report; and sending the encrypted telemetry report to a reporting system of the network, the encrypted telemetry report to be routed to the reporting system via one or more other systems of the network, where the reporting system is to send the encrypted telemetry report to an external verifier.

In Example 10, the method further comprises receiving, in the system, a public key of the external verifier, where the public key is received from another system of the network.

In Example 11, the method further comprises encrypting the local telemetry data of the system using the public key of the external verifier.

In Example 12, the method further comprises receiving a telemetry record from the another system of the network, the telemetry record generated by the external verifier to provide a format for collection of the local telemetry data.

In Example 13, the method further comprises collecting the local telemetry data responsive to the telemetry record.

In Example 14, at least one datum of the local telemetry data comprises a Boolean value.

In Example 15, the method further comprises routing the encrypted local telemetry data to the reporting system according to a mesh routing protocol.

In Example 16, the method further comprises generating, in the reporting system, a first random attestation value at a first time based on a common random seed value, the common random seed value shared by a plurality of reporting systems of the network.

In Example 17, the method further comprises discarding, from the system, a first encrypted telemetry data collection of a first system of the network, where the first encrypted telemetry data collection comprises a redundant collection received in at least two systems of the network.

In Example 18, the external verifier comprises at least one system of a second level of a multi-level network, the network comprising a first level of the multi-level network, and further comprising sending the encrypted telemetry report to the external verifier via an anonymizer network, to enable an identity of the system to remain anonymous to the external verifier.

In another example, a computer readable medium including instructions is to perform the method of any of the above Examples.

In another example, a computer readable medium including data is to be used by at least one machine to fabricate at least one integrated circuit to perform the method of any one of the above Examples.

In another example, an apparatus comprises means for performing the method of any one of the above Examples.

In Example 19, a system comprises: a processor to execute in a TEE, the processor may be configured to receive a plurality of attestation reports in a plurality of attestation sessions from a plurality of reporting nodes of a first network including a plurality of nodes, each of the plurality of attestation sessions in the corresponding reporting node based on a common random seed value used to form a Diffie-Hellman exponent that is common among the plurality of reporting nodes. The processor may further determine whether at least a threshold number of the plurality of attestation sessions produce identical attestation reports, and responsive to at least the threshold number of the plurality of attestation sessions providing the identical attestation reports, decrypt the plurality of attestation reports, and process the decrypted plurality of attestation reports to obtain aggregated telemetry data of the plurality of nodes. The system may be configured to enforce a security policy based at least in part on the aggregated telemetry data, where an identity of the plurality of nodes is to remain anonymous to the system.

In Example 20, the system is to receive the plurality of attestation reports via an anonymizer network coupled to the first network, where the anonymizer network is configured to enable the identity of the plurality of nodes to remain anonymous.

In Example 21, the system is to determine whether at least the threshold number of the plurality of attestation sessions comprises a common $g^a$ value.

In Example 22, the system is to generate a public key and a telemetry record and provide the public key and the telemetry record to the first network, to enable the public key and the telemetry record to be distributed to the plurality of nodes, to enable each of the plurality of nodes to generate a telemetry report to be provided within one of the plurality of attestation reports, where each telemetry report is encrypted using the public key.

In Example 23, the system comprises an external verifier having a private key that is used to decrypt the plurality of attestation reports having the aggregate telemetry data.

In Example 24, a system comprises: means for receiving a plurality of attestation reports in a plurality of attestation sessions from a plurality of reporting nodes of a first network including a plurality of nodes, each of the plurality of attestation sessions in the corresponding reporting node based on a common random seed value used to form a Diffie-Hellman exponent that is common among the plurality of reporting nodes. The system may further include means for determining whether at least a threshold number of the plurality of attestation sessions produce identical attestation reports, and means, responsive to at least the threshold number of the plurality of attestation sessions providing the identical attestation reports, for decrypting the plurality of attestation reports. The system may also include means for processing the decrypted plurality of attestation reports to obtain aggregated telemetry data of the plurality of nodes. Note that the system may also include means for enforcing a security policy based at least in part on the aggregated telemetry data, where an identity of the plurality of nodes is to remain anonymous to the system.

In Example 25, the system includes means for receiving the plurality of attestation reports via an anonymizer network coupled to the first network, the anonymizer network configured to enable the identity of the plurality of nodes to remain anonymous.

In Example 26, the system includes means for determining whether at least the threshold number of the plurality of attestation sessions comprises a common $g^a$ value.

In Example 27, the system includes means for generating a public key and a telemetry record and providing the public key and the telemetry record to the first network, to enable the public key and the telemetry record to be distributed to the plurality of nodes, to enable each of the plurality of nodes to generate a telemetry report to be provided within one of the plurality of attestation reports, where each telemetry report is encrypted using the public key.

In Example 28, the system comprises an external verifier means having a private key that is used to decrypt the plurality of attestation reports having the aggregate telemetry data.

In Example 29, a system for attesting one or more nodes in a first network comprises: means for receiving, in a system of an external verifier of a first network including a plurality of nodes, a plurality of attestation reports and a plurality of attestation values from a plurality of reporting nodes of the first network, each of the plurality of attestation values randomly generated in the corresponding reporting node based on a common random seed value; means for determining whether at least a threshold number of the plurality of attestation values match; responsive to at least the threshold number of the plurality of attestation values matching, means for decrypting the plurality of attestation reports, means for processing the decrypted plurality of attestation reports to obtain aggregated telemetry data of the plurality of nodes, wherein identity of the plurality of nodes remains anonymous to the external verifier; and means for enforcing a security policy based at least in part on the aggregated telemetry data.

In Example 30, the system further comprises means for receiving the plurality of attestation reports via an anonymizer network coupled to the first network, the anonymizer network to enable the identity of the plurality of nodes to remain anonymous to the external verifier.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed enable a system to:
   receive, in the system of an external verifier of a first network including a plurality of nodes, via an anonymizer network coupled to the first network, the anonymizer network to enable an identity of the plurality of nodes to remain anonymous to the external verifier, a plurality of attestation reports and a plurality of attestation values from a plurality of reporting nodes of the first network, the plurality of attestation values regarding an attestation of a hardware trusted execution environment (TEE) of a corresponding reporting node, each of the plurality of attestation values randomly generated in the hardware TEE of the corresponding reporting node based on a common random seed value;
   determine whether at least a threshold number of the plurality of attestation values match;
   responsive to at least the threshold number of the plurality of attestation values matching, decrypt the plurality of attestation reports, process the decrypted plurality of attestation reports to obtain aggregated telemetry data of the plurality of nodes; and
   enforce a security policy based at least in part on the aggregated telemetry data.

2. The at least one non-transitory computer readable storage medium of claim 1, further comprising instructions that when executed enable the system to provide a public key to the first network, to enable the public key to be distributed to the plurality of nodes.

3. The at least one non-transitory computer readable storage medium of claim 1, further comprising instructions that when executed enable the system to generate a telemetry record and provide the telemetry record to the first network, to enable the telemetry record to be distributed to the plurality of nodes, to enable each of the plurality of nodes to generate a telemetry report to be provided within one of the plurality of attestation reports.

4. The at least one non-transitory computer readable storage medium of claim 1, wherein the plurality of nodes comprises Internet of Things (IoT) devices, wherein the first network comprises an IoT network, the system of the external verifier coupled to the first network via the anonymizer network.

5. The at least one non-transitory computer readable storage medium of claim 1, wherein processing the decrypted plurality of attestation reports comprises determining a number of the plurality of nodes providing a first value for a first telemetry datum.

6. The at least one non-transitory computer readable storage medium of claim 1, wherein the system is to enter a trusted execution environment to receive the plurality of attestation reports and determine whether at least the threshold number of the plurality of attestation values comprises a common $g^a$ value.

7. A method comprising:
receiving, in a system of an Internet of Things (IoT) network, an encrypted telemetry data collection of one or more other systems of the IoT network;
in a hardware trusted execution environment (TEE) of the system, encrypting local telemetry data of the system with a public verification key received from an external verifier coupled to the IoT network via an anonymizer network to enable an identification of the system of the IoT network to remain anonymous to the external verifier;
in the hardware TEE, performing an addition operation using the encrypted local telemetry data and the encrypted telemetry data collection to generate an encrypted telemetry report; and
sending the encrypted telemetry report to a reporting system of the IoT network, the encrypted telemetry report to be routed to the reporting system via one or more other systems of the IoT network, wherein the reporting system is to send the encrypted telemetry report to the external verifier and generate a first random attestation value at a first time based on a common random seed value obtained from a seed tree of the reporting node according to a defined schedule, the common random seed value shared by a plurality of reporting systems of the IoT network.

8. The method of claim 7, further comprising receiving, in the system, a public verification key of the external verifier, wherein the public verification key is received from another system of the IoT network.

9. The method of claim 8, further comprising encrypting the local telemetry data of the system using the public verification key of the external verifier.

10. The method of claim 8, further comprising receiving a telemetry record from the another system of the IoT network, the telemetry record generated by the external verifier to provide a format for collection of the local telemetry data.

11. The method of claim 10, further comprising collecting the local telemetry data responsive to the telemetry record.

12. The method of claim 11, wherein at least one datum of the local telemetry data comprises a Boolean value.

13. The method of claim 7, further comprising routing the encrypted local telemetry data to the reporting system according to a mesh routing protocol.

14. The method of claim 7, further comprising discarding, from the system, a first encrypted telemetry data collection of a first system of the IoT network, wherein the first encrypted telemetry data collection comprises a redundant collection received in at least two systems of the IoT network.

15. The method of claim 7, wherein the external verifier comprises at least one system of a second level of a multi-level IoT network, the IoT network comprising a first level of the multi-level IoT network, and further comprising sending the encrypted telemetry report to the external verifier via an anonymizer IoT network, to enable an identity of the system to remain anonymous to the external verifier.

16. A system comprising:
a processor to execute in a hardware trusted execution environment (TEE), the processor to receive a plurality of attestation reports in a plurality of attestation sessions from a plurality of reporting nodes of a first network including a plurality of nodes, each of the plurality of attestation sessions in the corresponding reporting node based on a common random seed value obtained from a seed tree of the corresponding reporting node according to a defined schedule, the common random seed value shared by the plurality of reporting nodes and used to form a Diffie-Hellman exponent that is common among the plurality of reporting nodes, determine whether at least a threshold number of the plurality of attestation sessions produce identical attestation reports, responsive to at least the threshold number of the plurality of attestation sessions providing the identical attestation reports, decrypt the plurality of attestation reports, process the decrypted plurality of attestation reports to obtain aggregated telemetry data of the plurality of nodes, and enforce a security policy based at least in part on the aggregated telemetry data, wherein an identity of the plurality of nodes is to remain anonymous to the system, wherein the system is to receive the plurality of attestation reports via an anonymizer network coupled to the first network, the anonymizer network to enable the identity of the plurality of nodes to remain anonymous.

17. The system of claim 16, wherein the system is to determine whether at least the threshold number of the plurality of attestation sessions comprises a common $g^a$ value.

18. The system of claim 16, wherein the system is to generate a public key and a telemetry record and provide the public key and the telemetry record to the first network, to enable the public key and the telemetry record to be distributed to the plurality of nodes, to enable each of the plurality of nodes to generate a telemetry report to be provided within one of the plurality of attestation reports, each telemetry report to be encrypted using the public key.

19. The system of claim 16, wherein the system comprises an external verifier having a private key that is used to decrypt the plurality of attestation reports having the aggregate telemetry data.

* * * * *